Patented June 7, 1932

1,861,945

UNITED STATES PATENT OFFICE

HENRY L. WARD, OF CHICAGO, ILLINOIS, ASSIGNOR TO WESTERN ELECTRIC COMPANY, INCORPORATED, OF NEW YORK, N. Y., A CORPORATION OF NEW YORK

METHOD OF PRODUCING COMPOSITE ARTICLES

No Drawing.   Application filed August 9, 1924. Serial No. 731,041.

This invention relates to a method of producing composite articles comprising fibrous material and rubber.

Materials which are employed as separators for spring contacts for electrical switches and the like, or in panels for mounting electrical apparatus, besides being insulators, must possess requisite characteristics of tensile strength, hardness and rigidity. So called "phenol fibre" satisfies most of these requirements but it is expensive in price. Hard rubber possesses many of the same requisite qualities and is comparatively cheap in price; but it is subject to "cold flow" and this in time may cause warping and stretching of the article formed therefrom which may require frequent adjustment of the spring contacts or other apparatus supported thereby.

The object of this invention is to produce a material which will be strong, hard and not subject to objectionable cold flow; and which at the same time will be cheap in price.

In accordance with the main feature of the invention rubber and sufficient sulphur to cause complete vulcanization of the rubber are introduced into fibrous sheets by impregnating said fibrous sheets with an emulsion or a solution of rubber and sulphur in a suitable liquid. After impregnation the sheets are dried, then stacked in sufficient quantity to produce the thickness desired, and finally subjected to heat and pressure to thoroughly vulcanize the rubber, and form the fibrous sheets and ingrained rubber into a firm composite structure.

Although various types of fibrous sheets may be employed, it is preferable to use a porous paper which is highly absorbent, strong and entirely free from electricity conducting materials. A pure cotton-linter paper has been found to possess these characteristics.

The rubber may be introduced into the paper by means of an emulsion of rubber in water, by means of the natural latex, by means of a solution of rubber in an organic solvent, or by mechanical means. It is preferable, however, to employ rubber in the emulsified form or latex form, which is a natural water emulsion. The sulphur may be introduced in a number of ways. Good results may be obtained by grinding the sulphur in a colloid mill, and then introducing it directly into the latex. Sufficient sulphur may be suspended in the latex in this manner to bring about complete vulcanization. The amount of sulphur should be at least 30 per cent by weight of the rubber in the latex. A greater percentage of sulphur, namely as much as 50% may be satisfactorily used without deleteriously affecting the quality of the article produced. Good results may be obtained, however, by employing about 40% of sulphur.

A vulcanization accelerator of standard type such as diphenylguanidine may also be added with the sulphur. The amount of sulphur may be decreased if a large amount of accelerator is used, or may be entirely done away with by employing so called ultra-accelerators, such as zinc-ethyl-xenthozenate in sufficient quantity.

The paper of proper qualities having been treated with rubber in the manner described, it is thoroughly dried by exposure to the air or by artificial means, such as by subjecting it to an oven treatment or to a blast of dry, heated air. This latter may cause partial vulcanization of the rubber, which may even be desirable if not continued too far, because the time of treatment of the stacked sheets under pressure can then be reduced.

The treated and dried sheets are then arranged to produce the desired product, and finally subjected to heat and high pressure to completely vulcanize the rubber. The heat and pressure cause a further impregnation of the fibres of the paper and have the effect of joining the individual treated sheets into a composite structure, having the characteristics of hard rubber with added strength rigidity and resistance to cold flow.

The composite material is equivalent to hard rubber for insulation purposes and machines easily, being at the same time as cheap in price as hard rubber and cheaper in price than materials it can be used to supplant.

This material may be employed to separate the spring contacts of switches such as key switches which are used on telephone switchboards. In this type of switch spring contacts are separated by suitable electrical insulating material, which must possess enough strength and hardness to prevent the spring contacts from losing their adjustment by becoming loose. This improved material being hard and resistant to cold flow can be effectively used in this manner.

Besides the use described in the preceding paragraph it is obvious that the material herein described may be used for telephone switchboard and other panels for mounting electrical apparatus, and in other places where such qualities as cheapness, hardness, rigidity and resistance to cold flow are desired in an electrical insulating material.

What is claimed is:

1. The method of producing a composite insulator which consists in impregnating highly absorbent paper sheets free from electricity conducting materials with rubber and a vulcanizing agent, heating the impregnated sheets to vulcanize partially the rubber therein, assembling a plurality of impregnated sheets, and subjecting the assembled sheets to heat and pressure until the rubber therein is completely vulcanized.

2. A method of producing a composite insulator which consists in impregnating highly absorbent paper sheets free from electricity conducting materials with a rubber solution and a vulcanizing agent, heating the impregnated sheets to vulcanize partially the rubber therein, assembling a plurality of impregnated sheets, and subjecting the assembled sheets to heat and pressure until the rubber therein is completely vulcanized.

In witness whereof, I hereunto subscribe my name this 29th day of July, A. D. 1924.

HENRY L. WARD.